United States Patent
Engelgau et al.

(12)

(10) Patent No.: US 6,186,025 B1
(45) Date of Patent: Feb. 13, 2001

(54) BREAK AWAY PEDAL

(75) Inventors: Steven J. Engelgau, Royal Oak; Christopher Bortolon, Clawson, both of MI (US); Rolf Herbert Reidel, Windsor (CA)

(73) Assignee: Teleflex, Inc., Plymouth Meeting, PA (US)

( * ) Notice: Under 35 U.S.C. 154(b), the term of this patent shall be extended for 0 days.

(21) Appl. No.: 09/275,560

(22) Filed: Mar. 24, 1999

(51) Int. Cl.[7] ....................................... G05G 1/14
(52) U.S. Cl. ................... 74/512; 74/513; 74/514; 74/560
(58) Field of Search ............................. 74/512, 513, 514, 74/560, 561, 562, 522, 478; 403/109, 377

(56) References Cited

U.S. PATENT DOCUMENTS

| | | | |
|---|---|---|---|
| 3,128,859 | * 4/1964 | Griffen | 74/512 X |
| 4,424,890 | 1/1984 | Duethman . | |
| 4,818,036 | 4/1989 | Reinecke . | |
| 4,958,607 | 9/1990 | Lundberg . | |
| 5,038,907 | 8/1991 | Baumann . | |
| 5,215,176 | 6/1993 | Hamann . | |
| 5,385,068 | 1/1995 | White et al. . | |
| 5,551,317 | 9/1996 | Gautier et al. . | |
| 5,632,183 | * 5/1997 | Rixon et al. | 74/560 X |
| 5,632,184 | 5/1997 | Callicutt et al. . | |
| 5,697,260 | * 12/1997 | Rixon et al. | 74/514 |
| 5,819,593 | * 10/1998 | Rixon et al. | 74/514 |
| 5,916,330 | * 6/1999 | Jacobson | 74/512 |
| 5,964,125 | * 10/1999 | Rixon et al. | 74/513 X |
| 5,996,438 | * 12/1999 | Elton | 74/512 |

* cited by examiner

*Primary Examiner*—Vinh T. Luong
(74) *Attorney, Agent, or Firm*—Howard & Howard

(57) ABSTRACT

A pedal assembly (10) for use in a vehicle (11) comprising a pedal arm that moves in a normal operating range between a rest position and an applied position under a normal operating load and includes a rebound mechanism for moving the pedal arm to an extended position in response to an applied load greater than the normal operating load. The rebound mechanism rebounds the pedal arm to the normal operating range when the applied load is reduced to the normal operating load. In one embodiment, the break away and rebound pedal assembly (10) includes a first arm (20) having a first end (22) with a first pivotal connection (24) to the vehicle (11) for actuating an automotive system and extending to a second end (26). The assembly (10) also comprises a second arm (30) having third (32) and fourth (34) ends with a pad (36) supported on the fourth end (34). The invention is characterized by a rebound mechanism (40,140) connecting the second end (30) to the third end (32) at a second pivotal connection (42) for pivoting the arms (20,30) in unison in a normal position about the first pivotal connection (24) under normal loads applied to the pad (36). Further, the rebound mechanism (40,140) allows the second arm (30) to move relative to the first arm (20) about the second pivotal connection (42) in response to a predetermined load greater than the normal load. The second arm (30) is permitted to rebound back to the normal operating range upon the load falling below the predetermined load. A torsion spring (150) coupled with a friction pad (176) or a hydraulic, pneumatic, or spring loaded cylinder (50) may be used as part of the rebound mechanism.

11 Claims, 4 Drawing Sheets

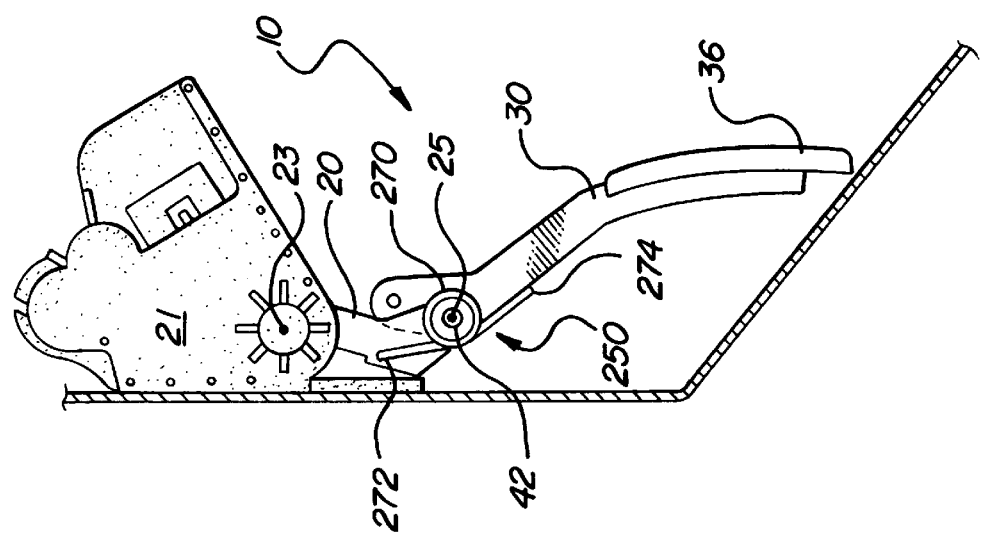
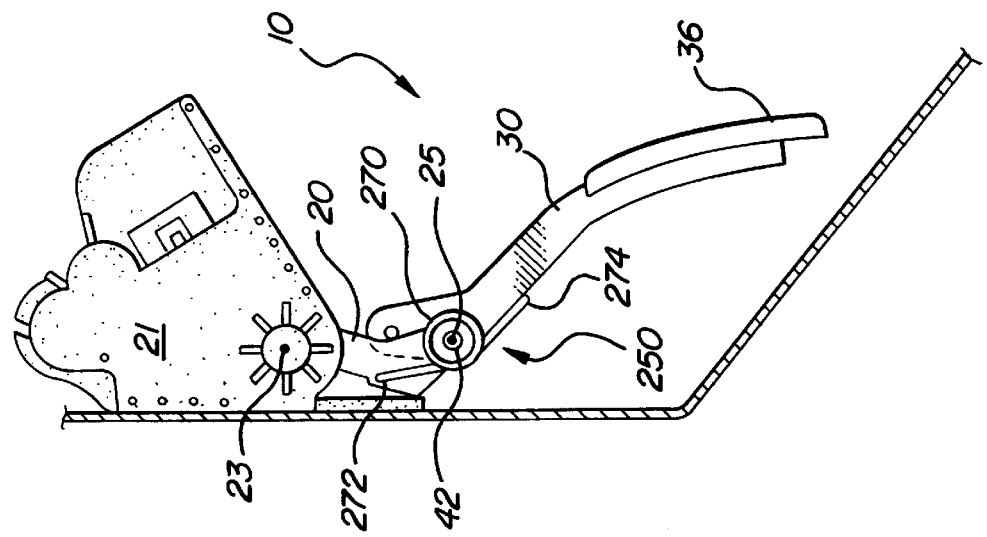
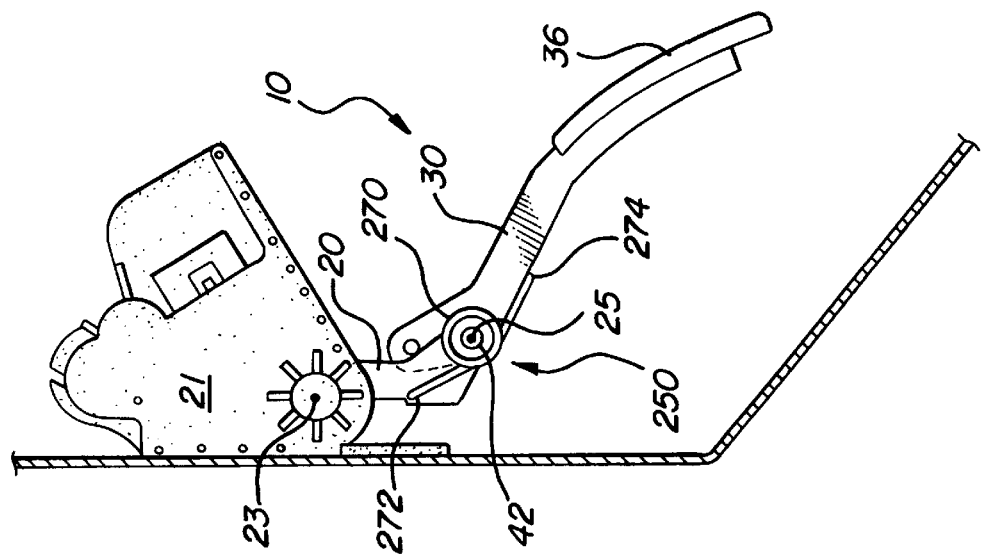

BREAK AWAY PEDAL

BACKGROUND OF THE INVENTION

1. Field of the Invention

This invention relates to vehicle pedal assemblies.

2. Description of the Prior Art

Traditional vehicle pedal assemblies may cause injuries to the lower extremities of a driver of a vehicle during a collision. To avoid or mitigate these injuries, pedal assemblies have been developed which break away during excessive loading to absorb the high forces that are generated by the driver hitting the pedal assembly. One such device is disclosed in U.S. Pat. No. 5,632,184 to Callicut et al. issued May 27, 1997. The Callicut patent discloses an assembly that has two linkages slidable relative to one another along an axis which collapses when excessive loading occurs during a collision. However, the load must be applied along the axis in order for the linkages to collapse. Therefore, what is needed is a more effective non-destructible break away pedal assembly.

SUMMARY OF THE INVENTION AND ADVANTAGES

The invention provides a pedal assembly for use in a vehicle comprising a pedal arm that moves in a normal operating range between a rest position and an applied position under a normal operating load and includes a rebound mechanism for moving the pedal arm to an extended position in response to an applied load greater than the normal operating load. The rebound mechanism rebounds the pedal arm to the normal operating range when the applied load is reduced to the normal operating load. The invention provides a pedal assembly for use in a vehicle comprising a pedal arm supported on a vehicle structure at a first pivot to define a first pivot axis and includes a resilient mechanism operably connected to the pedal arm at a second pivot to define a second pivot axis that is spaced apart from and generally parallel to the first pivot axis. The pedal arm pivots about the first pivot axis under a normal operating load and pivots about the second pivot axis in response to a predetermined load greater than the normal operating load.

Accordingly, the present invention provides a break away pedal assembly that breaks away, absorbing and mitigating high injury causing loads when a driver is thrust into the pedal assembly during a vehicle collision. The invention accomplishes this through non-destructive means so that the pedal assembly will not have to be replaced after a collision has occurred. A pivotal connection between the first and second arm is utilized so that a force may be applied along any portion of the second arm and the second arm will still break away.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6A is a side view of the pedal assembly of FIG. 5 shown in the rest position;

FIG. 6B is a side view of the pedal assembly of FIG. 5 shown in the applied position; and FIG. 6C is a side view of the pedal assembly of FIG. 5 shown in the extended position

DETAILED DESCRIPTION OF THE PREFERRED EMBODIMENT

Figure 1:
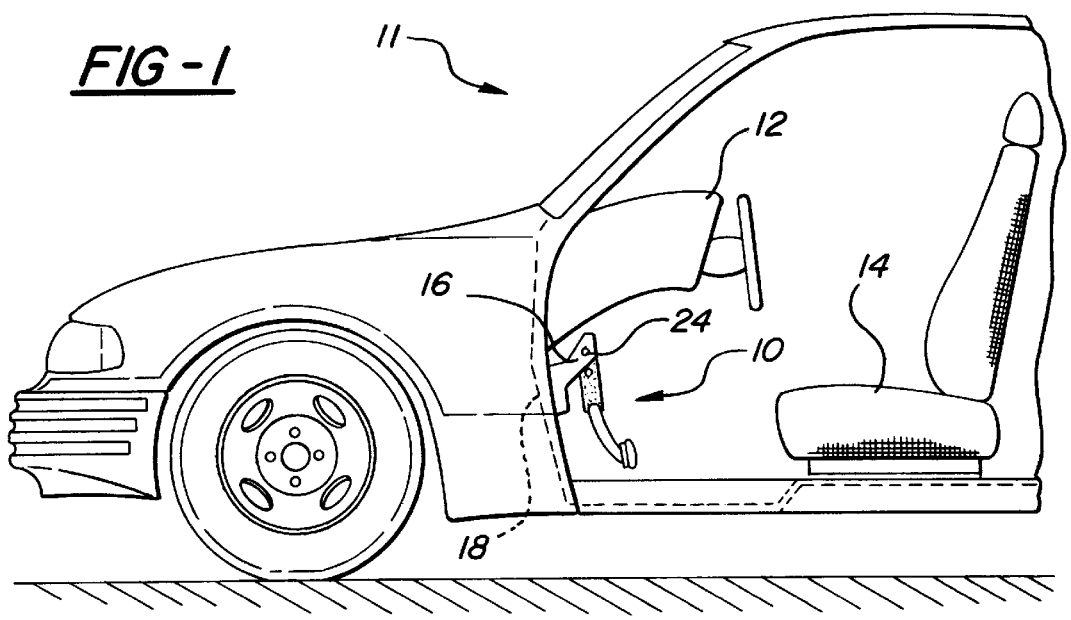
FIG. 1 is a partial view of an interior of a vehicle.

Referring to the Figures, wherein like numerals indicate like or corresponding parts throughout the several views, a break away and rebound pedal assembly is generally shown at 10 in FIG. 1 in a vehicle 11. Although a brake pedal is shown, the present invention may be used for any pedal assembly in a vehicle, such as a clutch or accelerator pedal assembly. The pedal assemblies are situated beneath an instrument panel 12 and project outward toward a driver's seat 14. Often in vehicle collisions, the driver is thrust from the seat forcing the driver's legs violently toward the pedal assemblies thereby injuring the driver.

A bracket 16 for supporting the pedal assembly 10 is attached to a firewall 18 or other suitable structure. The invention provides a pedal assembly 10 for use in a vehicle 11 comprising a pedal arm that moves in a normal operating range between a rest position and an applied position under a normal operating load and includes a rebound mechanism for moving the pedal arm to an extended position in response to an applied load greater than the normal operating load. The rebound mechanism rebounds the pedal arm to the normal operating range when the applied load is reduced to the normal operating load. The pedal arm can be a single piece arm or can be comprised of a plurality of arm portions.

Figure 2:
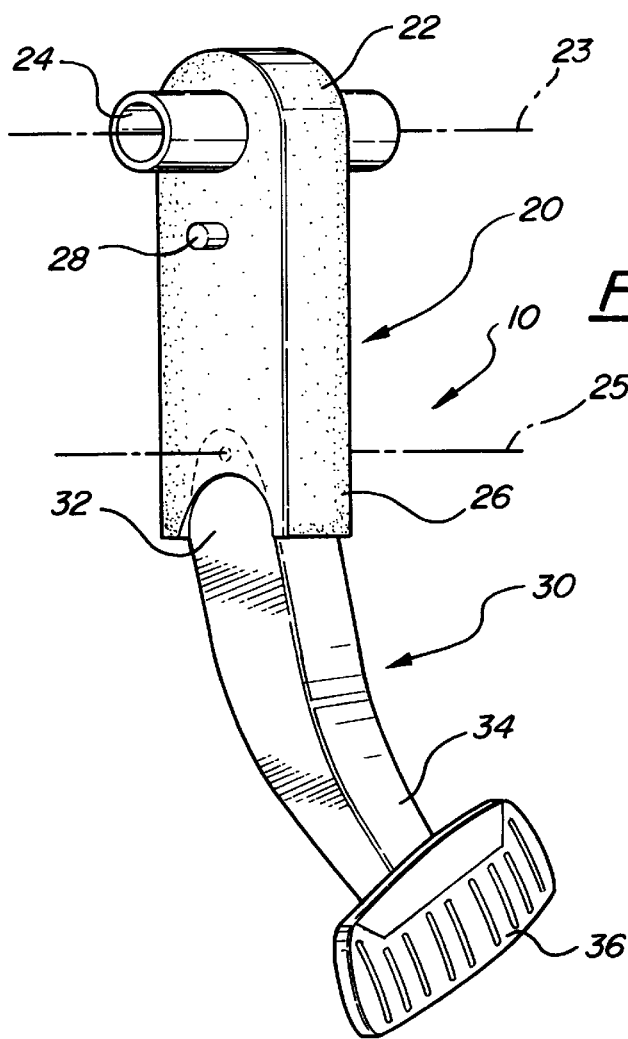
FIG. 2 is a perspective view of the break away pedal assembly of the present invention.

Referring now to FIG. 2, one embodiment of the pedal assembly 10 comprises a first arm 20 having a first end 22 with a first pivotal connection, or pivot, 24 at the bracket 16 by means known in the art. The first arm 20 is pivoted about the first pivotal connection 24 to actuate an automotive system, in the case of a brake pedal assembly, the brake system. The first arm 20 also includes a second end 26 extending from the first end 22.

The first arm 20 further includes a connector 28 for attaching any push-pull assembly or other pedal position indicating devices associated with the operation of the pedal assembly 10. The pedal assembly 10 includes a second arm 30 that has third 32 and fourth 34 ends and a pad 36 supported on the fourth end 34. The assembly 10 is characterized by a rebound mechanism, shown in FIGS. 3 and 4 at 40 and 140, respectively, connecting the second end 26 to the third end 32 at a second pivotal connection, or pivot, 42. The rebound mechanism 40,140 permits pivoting of the arms 20,30 in unison in a normal position about the first pivotal connection 24 under normal loads applied to the pad 36. Thus, under normal operating conditions, that is in non-crash conditions, the pedal assembly 10 will pivot about the first pivotal connection 24 as if the first 20 and second 30 arms were a unitary, rigid structure. In this manner, the pedal assembly 10 will operate and have the feel of a traditional pedal assembly.

However, the rebound mechanism 40,140 allows the second arm 30 to move relative to the first arm 20 about the second pivotal connection 42 in response to a predetermined load greater than the normal load. During a collision, high loads are generated at the pedal assembly 10 from the force of the driver colliding with the pedal assembly. The pedal assembly 10 gives way and absorbs some of the load thereby eliminating or minimizing injury to the driver when the second arm 30 pivots relative to the first arm 20. When the predetermined load is removed the second arm 30 rebounds to the normal operating range. However, the second arm 30 rebounds at a controlled rate so as to avoid injuring the driver by the second arm 30 snapping back at the driver.

The first pivotal connection 24 defines a first pivot axis 23 and the second pivotal connection 42 defines a second pivot axis 25. The second pivot axis 25 is preferably spaced apart from and generally parallel to the first pivot axis 23.

The first arm 20 also serves as a housing for the components of the rebound mechanism 40,140 for providing a more pleasing appearance of the brake pedal assembly 10 and to protect the rebound mechanism 40,140 components.

Figure 3:
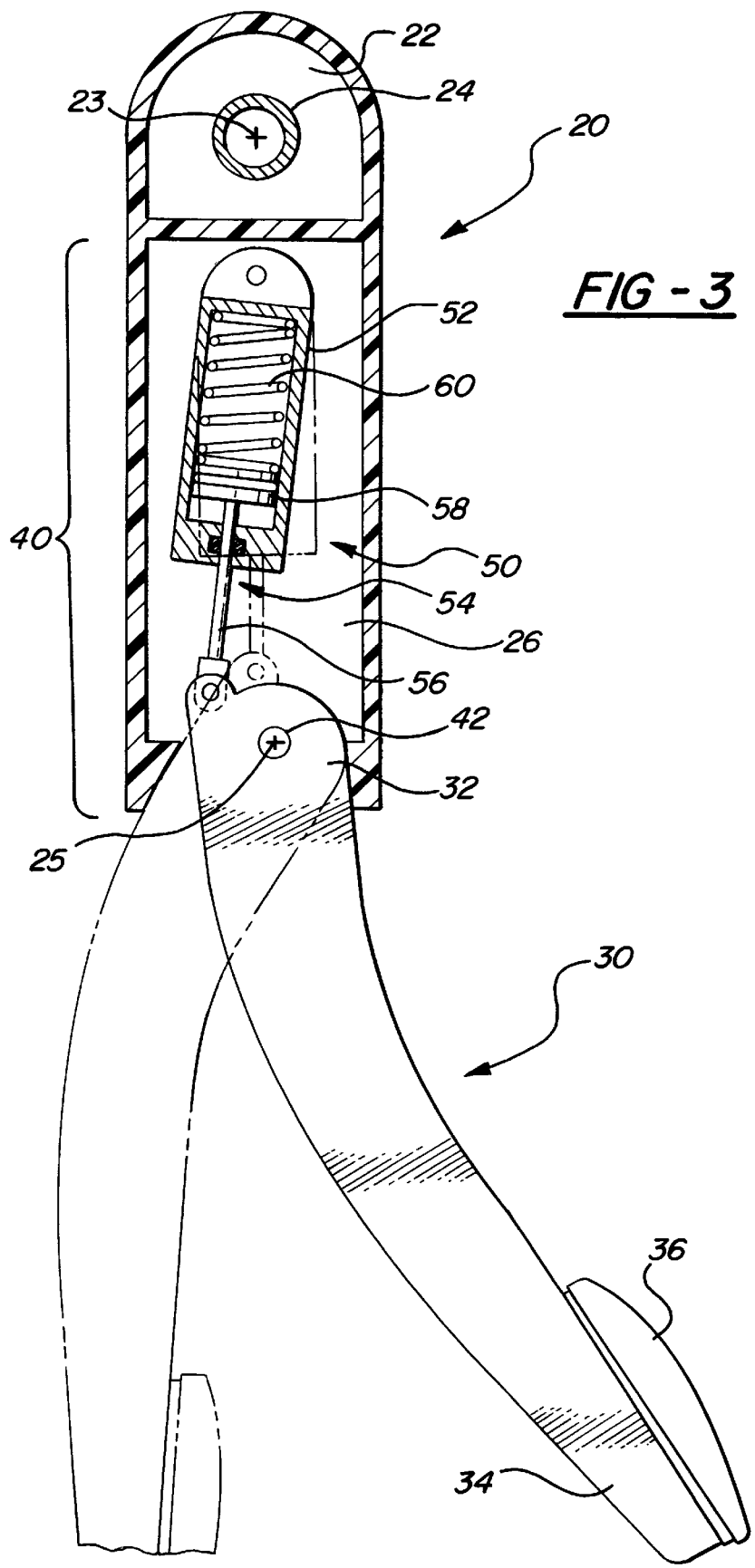
FIG. 3 is a cross-sectional view of one embodiment of the present invention.

The rebound mechanism 40,140 may include a resilient member having memory for connecting the first 20 and second 30 arms to accomplish the break away and rebound function. The resilient member may be a hydraulic, pneumatic, or spring loaded cylinder assembly 50, as shown in FIG. 3. The cylinder assembly 50 has a first cylinder-like portion 52 pivotally attached to the first arm 20. A second portion 54 including a rod 56 is pivotally attached to the second arm 30 and further includes a piston 58 disposed within the cylinder 52. A spring 60 is interposed between the cylinder 52 and piston 58 for urging the second arm 30 to the normal operating range. When the normal load is exceeded, the second arm 30 pivots about the second pivotal connection 42 thereby causing the rod 56 and piston 58 to collapse the spring 60. Hence, the excessive load is absorbed by the spring 60. When the excessive load is removed, the second arm 30 rebounds at a controlled rate.

Figure 4:
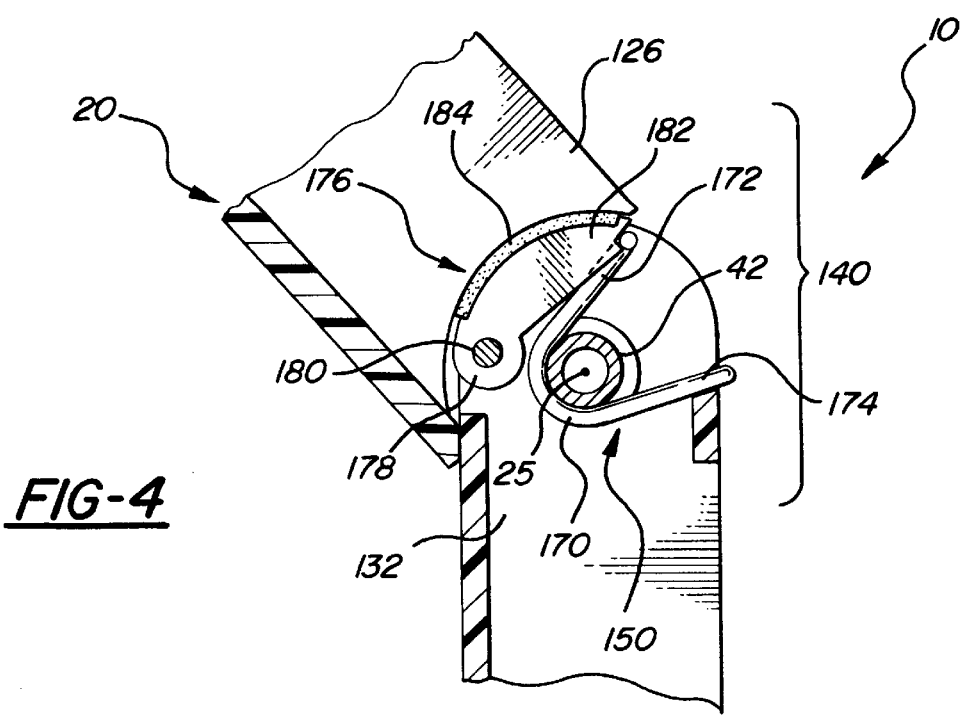
FIG. 4 is a cross-sectional view of another embodiment of the present invention.
Figure 5:
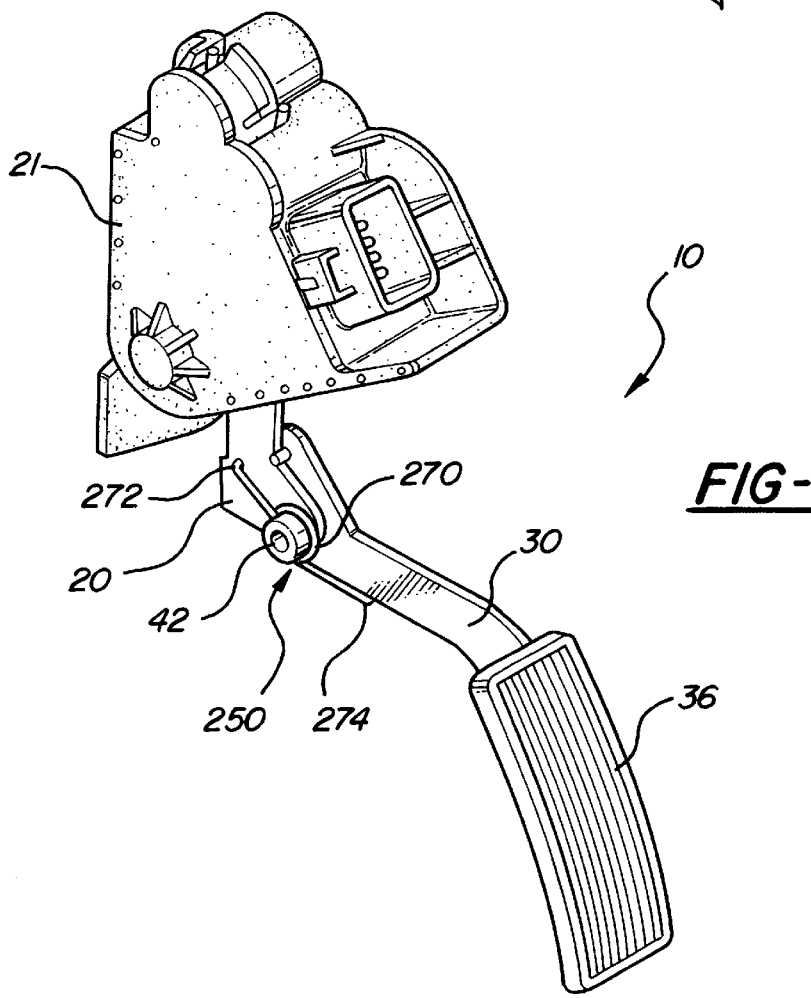
FIG. 5 is a perspective view of another embodiment of the present invention.

Alternatively, as shown in FIG. 4, the resilient member of the rebound mechanism 140 may be a torsion spring 150 having a coil portion 170 positioned proximate the second pivotal connection 42. The torsion spring 150 includes first 172 and second 174 legs that extend from the coil portion 170 for engaging the first 20 and second 30 arms, respectively. The torsion spring 150 is compressed when the load exceeding the normal load is reached.

The rebound mechanism 140 further comprises a friction pad 176 having a first portion 178 that includes a third pivotal connection 180. The friction pad 176 is attached to the third end 132 of the second arm 30 at the third pivotal connection 180 and allows rotation of the friction pad 176. A second portion 182 opposes the first portion 178 and engages the first leg 172 of the torsion spring 150. The friction pad 176 further includes a friction surface 184 that is urged into engagement with the second end 126 of the first arm 20 by the torsion spring 150 and creates friction between the first 20 and second 30 arms thereby controlling the rate at which the second arm 30 rebounds relative to the first arm 20.

In an accelerator pedal embodiment, shown in FIGS. 5 and 6A–6C, an electronic throttle control 21 is mounted to the first end 22 of the first arm 20. The electronic throttle control 21 generates an electronic signal that varies according to the position of the pedal arm as the arm pivots about the first pivotal connection 24 under normal operating loads. The pedal assembly 10 with an electronic throttle control 21 includes a resilient mechanism for breaking away the pedal arm under loads greater than normal operating loads. The spring member is preferably a torsion spring 250 having a coil portion 270 located adjacent to the second pivot 42 and including a first leg 272 extending from the coil portion 270 for engaging the first arm 20 and a second leg portion 274 extending from the coiled portion 270 for engaging the second arm 30.

The pedal assembly 10 operates in a normal operating range where the pedal arms 20, 30 move between a rest position, shown in FIG. 6A, and a full applied position where the pedal arms 20, 30 pivot in unison about the first axis 23, shown in FIG. 6B. When the normal operating load is exceeded, the torsion spring 250 is compressed and the second arm 30 pivots about the second pivot axis 25 relative to the first arm 20 and moves to an extended position, shown in FIG. 6C. When the excessive loading is reduced, the torsion spring 250 returns the second arm 30 to the normal operating range.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A pedal assembly (10) for use in a vehicle (11) comprising:

a pedal arm having a first pivot (24) for connection to a vehicle structure for rotation about a first pivot axis (23); and said pedal arm including a first arm (20) and a second arm (30), said first arm (20) having a first end (22) including said first pivot (24) and extending to a second end (26) including a second pivot (42), said second arm (30) having third end (32) connected to said second pivot (42) said second arm (30) extending to a fourth end (34) for supporting a pad (36);

a resilient mechanism operatively interconnecting and reacting between said first (20) and second (30) arms connected to said pedal arm and associated with a second pivot (42) which defines adjacent said second pivot axis (25) so that said first (20) and second (30) arms pivot in unison about said first pivot axis (23) under a normal operating load and said second arm (30) pivots relative to said first arm (30) about said second pivot axis (25) in response to a predetermined load greater than said normal operating load.

2. An assembly as set forth in claim 1 wherein said resilient mechanism returns said pedal arm from said extended position to said normal operating range in response to said normal operating load being achieved.

3. The assembly as set forth in claim 2 wherein said resilient mechanism further comprises a housing (304) and a resilient member (306) interposed between said housing (304) and said pedal arm.

4. The assembly as set forth in claim 3 wherein said pedal arm further comprises an upper portion (308) having a slot (310) including first (312) and second opposing regions (314) with said first pivot (24) being disposed within said slot (310), said first pivot (24) being positioned in said first region (312) when said pedal arm is under said normal operating loads and said first pivot (24) being positioned in said second region (314) in response to said predetermined load greater than said normal operating load and said pedal arm pivoting about said second pivot axis (25).

5. An assembly as set forth in claim 1 wherein said resilient mechanism is a spring member having memory for connecting said first (20) and second (30) arms.

6. An assembly as set forth in claim 5 wherein said spring member is a torsion spring (150,250) having a coil portion (170,270) located adjacent to said second pivot (42) and including first (172,272) and second (174,274) legs extending from said coil portion (170,270) for engaging said first (20) and second (30) arms respectively.

7. An assembly as set forth in claim 1 including an electronic throttle control (21) that is responsive to said first pivot (24) for providing a signal that corresponds to pedal arm position as said pedal arm pivots about said first pivot axis (23) between rest and full applied positions.

8. The assembly as set forth in claim 1 further comprising a friction pad (176) having:
- a first portion (178) including a third pivotal connection (180) to said third end (132) of said second arm (30) for allowing rotation of said friction pad (176);
- a second portion (184) opposing said first portion (126) for engaging said first leg (172) of said torsion spring (150); and
- a friction surface (184) for engaging said second end (126) of said first arm (20) for creating friction between said first (20) and second (30) arms and controlling a rate at which said second arm (30) rebounds relative to said first arm (20).

9. The assembly as set forth in claim 1 wherein said resilient member is a hydraulic cylinder (50) having a first portion (52) pivotally attached to said first arm (20) and a second portion (54) pivotally attached to said second arm (30).

10. The assembly as set forth in claim 1 wherein said resilient mechanism includes a pneumatic cylinder (50) having a first portion (52) pivotally attached to said first arm (20) and a second portion (54) pivotally attached to said second arm (30).

11. The assembly as set forth in claim 1 wherein said resilient mechanism includes a spring loaded cylinder (50) having a first portion (52) pivotally attached to said first arm (20) and a second portion (54) pivotally attached to said second arm (30).

* * * * *